United States Patent
Kadoya et al.

(10) Patent No.: US 11,112,614 B2
(45) Date of Patent: Sep. 7, 2021

(54) LIGHT-EMITTING DEVICE

(71) Applicant: SHIMADZU CORPORATION, Kyoto (JP)

(72) Inventors: Akiyuki Kadoya, Kyoto (JP); Ichiro Fukushi, Kyoto (JP); Koji Tojo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/214,656

(22) Filed: Dec. 10, 2018

(65) Prior Publication Data

US 2019/0179092 A1   Jun. 13, 2019

(30) Foreign Application Priority Data

Dec. 12, 2017   (JP) .............................. JP2017-237374

(51) Int. Cl.
   *G02B 27/09*   (2006.01)
   *G02B 27/28*   (2006.01)
   *G02B 27/10*   (2006.01)
   *G02B 6/42*    (2006.01)
   *G02B 27/30*   (2006.01)

(52) U.S. Cl.
   CPC ....... *G02B 27/0905* (2013.01); *G02B 6/4206* (2013.01); *G02B 27/0916* (2013.01); *G02B 27/106* (2013.01); *G02B 27/283* (2013.01); *G02B 27/30* (2013.01)

(58) Field of Classification Search
   CPC .... G02B 27/10–27/16; G02B 6/4204–6/4206; B23K 26/067–26/0738; H01S 3/005
   USPC .......................................... 359/618, 639–640
   See application file for complete search history.

(56) References Cited

U.S. PATENT DOCUMENTS

| | | | | |
|---|---|---|---|---|
| 5,258,989 A | * | 11/1993 | Raven | ..................... H01S 3/005 372/6 |
| 6,922,288 B2 | * | 7/2005 | Yamanaka | ......... G02B 19/0028 359/618 |
| 6,993,059 B2 | * | 1/2006 | Anikitchev | ........ G02B 27/0977 372/100 |
| 2005/0063436 A1 | | 3/2005 | Nishimura et al. | |

FOREIGN PATENT DOCUMENTS

| | | |
|---|---|---|
| JP | H 07-181425 A | 7/1995 |
| JP | 2003-279885 | 10/2003 |
| JP | 2004-326008 A | 11/2004 |
| JP | 2004354898 A * | 12/2004 |

OTHER PUBLICATIONS

JP 2004-354898; Published Dec. 16, 2004; with Human Translation (Year: 2004).*
JP 2017-237374, Notice of Reasons for Refusal, dated Mar. 9, 2021, 3 pages—English, 3 pages—Japanese.

* cited by examiner

*Primary Examiner* — Zachary W Wilkes
(74) *Attorney, Agent, or Firm* — Andrew F. Young, Esq.; Nolte Lackenbach Siegel

(57) ABSTRACT

A light-emitting device improves the beam quality of emission light from a single emitter light source in the slow-axis direction, and includes a light source 10 having a single emitter and a beam shaping module that splits the emission light from the light source into to a plurality of split-lights in the slow-axis direction, and shapes the split-lights as a shaped-beam arrayed in the fast-axis direction, and outputs the shaped-beam.

4 Claims, 15 Drawing Sheets

LIGHT-EMITTING DEVICE

CROSS REFERENCE TO RELATED APPLICATIONS

This application relates to, and claims priority from JP 2017-237374 filed Dec. 12, 2017, the entire contents of which are incorporated herein by reference.

FIGURE SELECTED FOR PUBLICATION

FIG. 1

BACKGROUND OF THE INVENTION

Field of the Invention

The present invention relates to a light-emitting device that shapes the lights emitted from the light source and outputs the shaped light.

Description of the Related Art

The light-emitting device is used to guide the converged light into the light receiving device such as an optical fiber to obtain a high-power output. Such a light-emitting device is adopting the method to converge the emitted light from the light emission diode (LED) or a semiconductor laser as a light source by using an optical element such as a lens or a prism.

In addition, with regard to the emission-light such as semiconductor laser, an improvement of the beam quality of the slow-axis, of which beam quality is lower than the beam quality of the fast-axis, is under study. For example, the method, in which the emission light of the semiconductor laser array in which a plurality of the light-emitting areas (emitters) in the slow-axis (horizontal) direction are paralleled light is split by the optical element in the slow-axis direction, and the split laser lights are paralleled in the fast-axis direction, is proposed.

RELATED PRIOR ART DOCUMENTS

Patent Document

Patent Document 1: JP Patent Published 2003-279885

Aspects and Summary of the Invention

Objects to be Solved

Even when a light source for the single emitter is used, it is desirable that the beam quality in the slow-axis direction is improved. For example, when the emission light of the high-power semiconductor laser having the single emitter is coupled to the optical fiber having a small core and a low numerical aperture (NA), the beam quality in the fast-axis (vertical) direction is not concerned, but the beam quality in the slow-axis direction is low (poor), so that the emission light cannot be coupled in a high-efficiency.

Considering the above issues, the purpose of the present invention is to provide a light-emitting device that improves the beam quality in the slow-axis direction of the emission light from a single emitter light source.

Means for Solving the Problem

According to the aspect of the present invention, the present invention provides a light-emitting device that comprises a light source having a single emitter and a beam shaping module that splits the emission light from the light source to a plurality of split-lights in the slow-axis (horizontal) direction, shapes the plurality of split-lights to create the shaped-beam that are arrayed in the fast-axis (vertical) direction, and outputs such a shaped-beam.

Effect of the Invention

According to the aspect of the present invention, the present invention provides the light-emitting device that improves the beam quality of the emission light from the single emitter light source in the slow-axis (horizontal) direction is provided.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
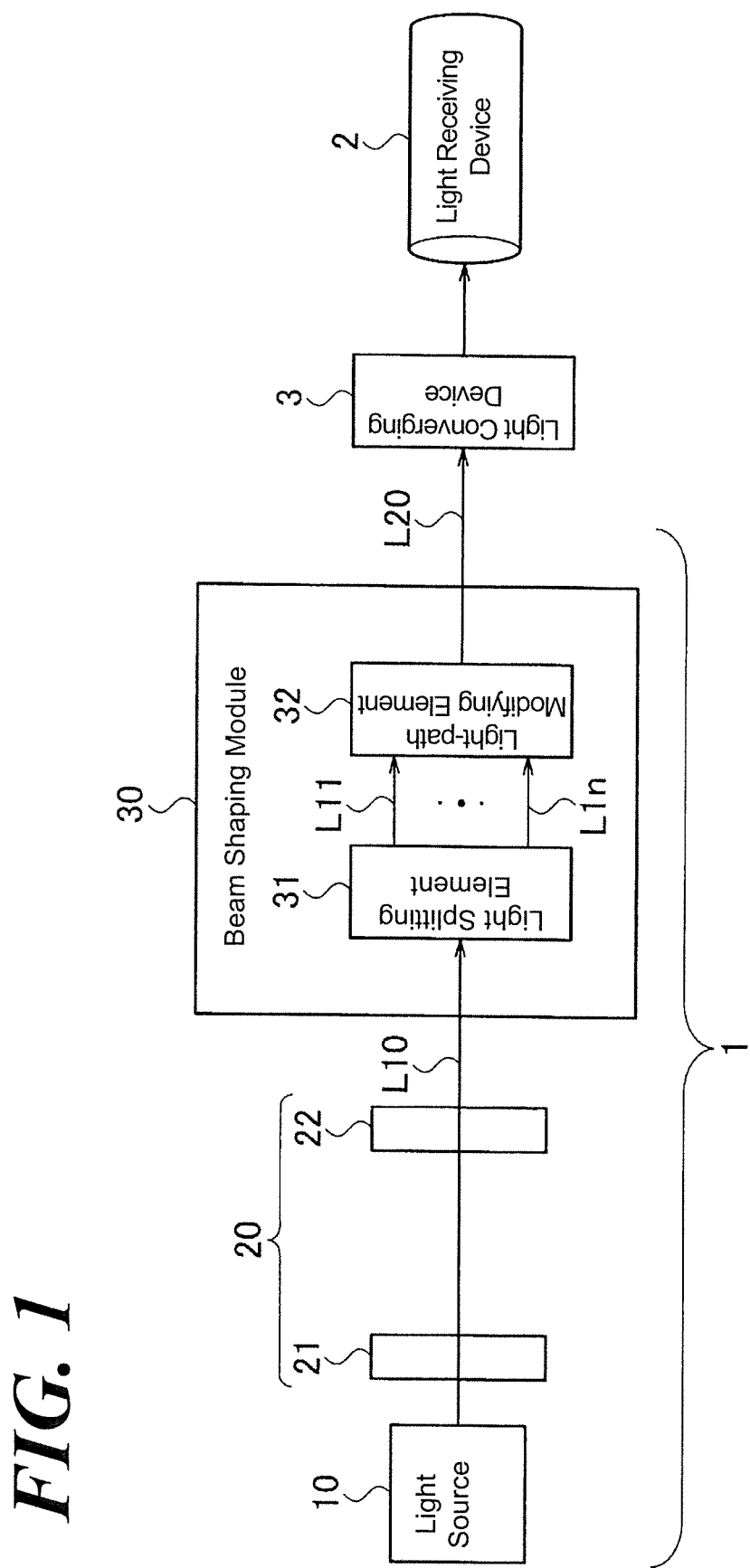
FIG. 1 is a schematic diagram illustrating the structure of a light-emitting device according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Those of skill in the art have great skill, having advanced training understand all the conventionally known circuits, elements, and arrangements and understand that any circuit, element, or related computational type system includes an input device for receiving data (of any type), an output device for outputting data in any tangible form (e.g. single, data, display, light, etc., any suitable memory for storing data as well as computer code, and for executing the same.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Referring to all the figures (FIGS.), the inventors set forth the Embodiments of the present invention. Referring to FIGS., the same or similar element has the same or similar sign. However, it must be paid attention that FIGS. are schematic. In addition, hereinafter, the aspect of the Embodiment is an example to specify the technology aspect of the present invention and the structure and the arrangement of the components are not limited to the aspect of the Embodiment. The aspect of the Embodiment of the present invention can be modified in a variety of aspects within the scope of claimed claims of the present invention.

Embodiment 1

Referring to FIG. 1, according to the aspect of the Embodiment 1 of the present invention, the light-emitting device 1 comprises a light source 10 having a single emitter and a beam shaping module 30 that splits the emission light L10 from the light source 10 to a plurality of split-lights L11-L1$n$ in the slow-axis direction, shapes the split-lights L11-L1$n$ as the shaped-beam L20 arrayed in the fast-axis direction, and outputs such a shaped-beam (n is an integer at least 2).

Referring to FIG. 1, the light-emitting device 1 further comprises a collimator 20 that collimates the emission light L10 of the light source 10 in the fast-axis direction of the emission light L10 and the slow-axis direction thereof. Specifically, the emission light L10 that is collimated in the fast-axis direction and the slow-axis direction is guided *(induced) into the beam shaping module 30, and the collimator 20, referring to FIG. 1, comprises the F-axis collimator lens 21 that collimates the emission light L10 in the fast-axis direction and the S-axis collimator lens 22 that collimates the emission light L10 in the slow-axis direction. Referring to FIG. 1, the F-axis collimator lens 21 is in-place right near the light source 10 and the S-axis collimator lens 22 is in-place in a constant interval from the F-axis collimator lens 21.

Specifically, the emission light L10 is collimated by the F-axis collimator lens 21 followed by being collimated by the S-axis collimator lens 22. The beam shaping module 30 outputs the shaped-beam L20 that is the shaped collimated emission light L10.

The shaped-beam L20 output from the beam shaping module 30 is converged by the light converging device 3 and then, guided to the light receiving device 2. The light receiving device 2 is e.g., an optical fiber, and the shaped-beam L20 is converged into the core of the optical fiber. The converging device 3 is e.g., a converging lens.

Figure 2:
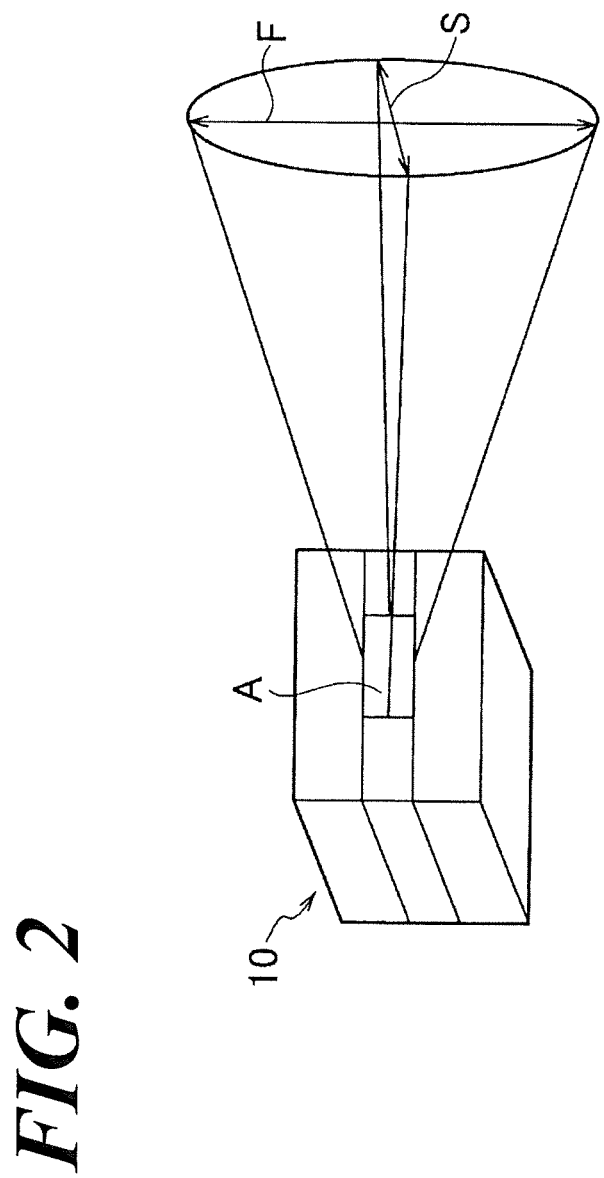
FIG. 2 is a schematic diagram illustrating a beam shape of an emission light of a light source.

For example, the light source 10 is the single emitter high-power semiconductor laser. With regard to such as a semiconductor laser having the single emitter, the beam shape of the perpendicular cross-section to the traveling direction of the emission light (hereinafter, called traveling surface) is an ellipse (oval shape). For example, with regard to the emission light from the edge-emitting type single emitter semiconductor laser, the beam thereof largely broadens in the direction in which the emitter size is smaller. Specifically, referring to FIG. 2, the broad-size direction of the emitter area A is a slow-axis direction S and the narrow-size direction of the emitter area A is the fast-axis direction F.

With regard to the emission light L10 of the light source 10, the beam quality in the slow-axis direction S is lower than in the fast-axis direction F. Specifically, the edge of the beam in the slow-axis direction S is poor (less focused) compared to the fast-axis direction F and as a result, a sharp shape cannot be obtained when converging the light. Therefore, when the emission light L10 of the light source 10 couples as-is with the optical fiber, it is problematic that the coupling efficiency worsens.

Whereas the light-emitting device 1, referring to FIG. 1, improves the beam quality in the slow-axis direction S of the emission light L10 due to the beam shaping module 30. Specifically, the emission light L10 is split in the slow-axis direction S in which the beam quality is poor and then, the split-lights L11-L1n are overlapped in the fast-axis direction F. In such a way, the length of the shaped-beam L20 in the slow-axis direction S shortens, and as a result, the coupling efficiency improves.

At the same time, the quality of the shaped-beam L20 in the fast-axis direction F worsens. Whereas the beam quality in the fast-axis direction F is several ten times better than in the slow-axis direction S, so that a decrease of the coupling efficiency is never concerned.

Hereinafter, the inventor sets forth an operation of the light-emitting device 1.

Referring to FIG. 1, the emission light L10 emitted from the light source 10 is first collimated in the fast-axis direction F by the F-axis collimator lens 21. The beam quality in the fast-axis direction F is high, so that the interval between the light source 10 and the F-axis collimator lens 21 is arbitrary, whereas the narrower the interval is, the smaller the size of the light-emitting device 1 can be.

The emission light L10 of which the beam shape in the traveling surface is broadening in the slow-axis direction S is guided into the S-axis collimator lens 22 that is in-place in the constant interval from the F-axis collimator lens 21, and the emission light L10 is collimated in the slow-axis direction S. Then, the emission light L10 having a long and thin beam shape in the slow-axis direction S is guided into the beam shaping module 30.

The beam shaping module 30 comprises the light splitting element 31 and the light-path modifying element 32. The light splitting element 31 divides the emission light L10 to a plurality of the split-lights L11~L1n by modifying the light-axis from the original light-axis thereof relative to the part of the collimated emission light L10. The light-path modifying element 32 propagates the divided lights L11~L1n respectively in the different light-path. In addition, the light-path modifying element 32 comprises respective light paths of the split-lights L11~L1n so that the split-lights L11~L1n are arrayed in the fast-axis direction F.

The light splitting element 31 splits the emission light L10 so as to change the light-axis of at least one split-light of the split-lights L11~L1n. Accordingly, for example, the split-lights L11~L1n travel (propagate) in parallel to and in split from each other. Or the emission light L10 is split so that the light-axis of the beam of the part passing the light splitting element 31 and the light-axis of the beam of the part not passing cross with a constant angle so that the split-lights L11~L1n travel respectively in the different direction from each other.

The light splitting element 31 may include e.g., a laser window, a beam splitter (e.g., splitter), an optical mirror, a prism and so forth. In addition, an optical mirror, a prism and so forth is applicable to the light-path modifying element 32.

Figure 3:
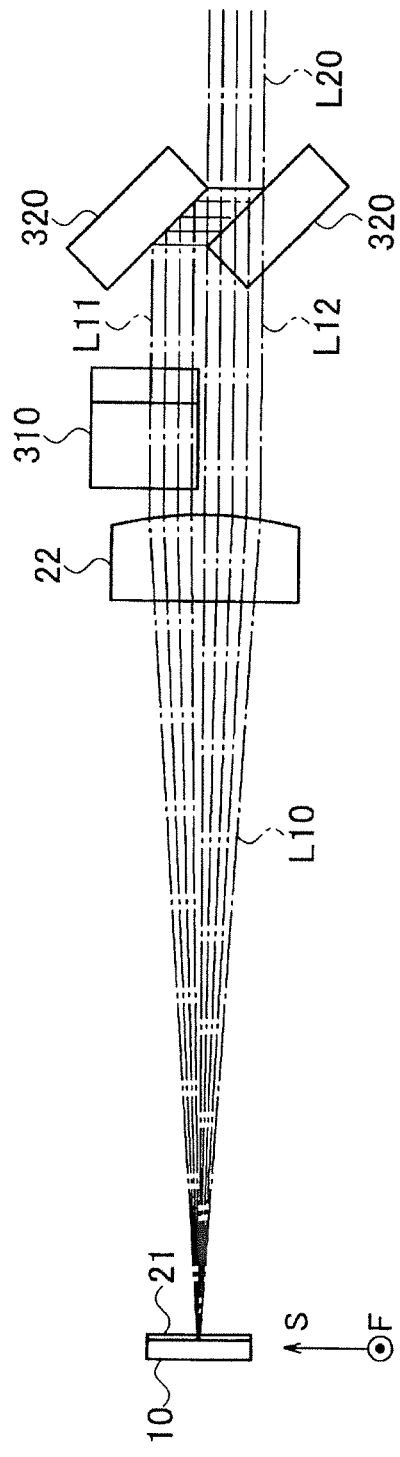
FIG. 3 is a schematic diagram illustrating a beam-shaping example viewing from the fast-axis direction by the light-emitting device according to the aspect of the Embodiment 1 of the present invention.
Figure 4:
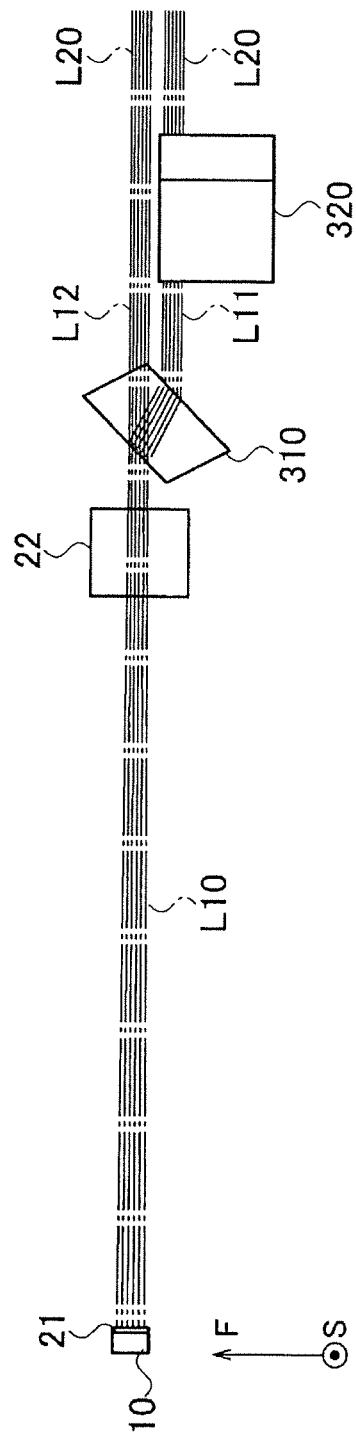
FIG. 4 is a schematic diagram illustrating a beam-shaping example viewing from the slow-axis direction by the light-emitting device according to the aspect of the Embodiment 1 of the present invention.

Referring to FIG. 3, 4, the laser splitter (window) 310 as the light splitting element 31 is in-place tilting to the light-axis and the light-path modifying element 32 is the optical mirror 320. Specifically, the tilting laser splitter (window) 310 splits the emission light L10 two lights consisting of the split-light L11 and the split-light L12 in the slow-axis direction S. In such a way, the laser splitter 310 is applied to the light splitting element 31, so that the light-axis of the split-light L11 that transmits the laser splitter 310 changes (shifts) from the light-axis of the emission light L10 before splitting. On the other hand, the light-axis of the split-light L12 does not change from the emission light L10 before splitting.

Now, the light path of the split-light L11 is modified by the optical mirror 320, and the split-light L11 and the split-light L12 overlap and are arrayed in the fast-axis direction F.

Figure 5:
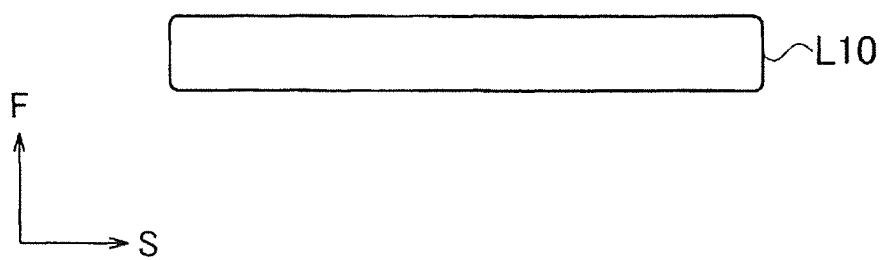
FIG. 5 is a schematic diagram illustrating a beam shape of the traveling surface of the emission light prior to beam-shaping by the beam shaping module of a light-emitting device according to the aspect of the Embodiment 1 of the present invention.

Referring to FIG. 5, for example, the beam shaping module 30 splits the emission light L10, of which the traveling surface has the long and thin beam shape in the slow-axis direction S, is split in the slow-axis direction S. Then, the shaped-beam L20 is obtained, wherein the split-light L11 of the emission light L10 and the split-light L12 thereof overlap in the fast-axis direction F.

Figure 6:
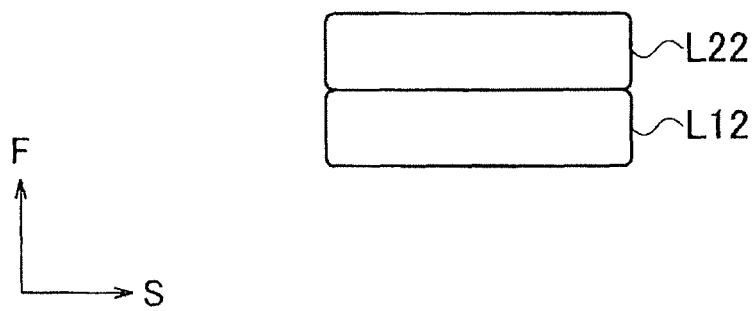
FIG. 6 is a schematic diagram illustrating a beamed-shape of the traveling surface of the emission light following beam-shaping by the beam shaping module of a light-emitting device according to the aspect of the Embodiment 1 of the present invention.

In addition, referring to FIG. 6, the beam shape of the traveling surface is obtained by dividing the emission light L10 equally to two portions. Specifically, the light splitting element 31 is in-place at the location where a half of the beam along the slow-axis direction passes through. For example, with respect to the half of the beam passing through the laser splitter 310, the laser splitter 310 is in-place with the shifting angle from the light-axis of the beam of which the light-axis is not passing the laser splitter 310.

Regardless of splitting the emission light L10 equally to two, the shaped-beam L20 of which the shape of the traveling surface is a rectangular shape is obtained by that the beam shaping module 30 splits the emission light L10 equally as the respective lengths of the split-lights in the slow-axis direction S are the same.

In addition, when the laser splitter 310 is applied to the light splitting element 31, the smaller angle between the incidence surface of the laser splitter, to which the emission light L10 is incident, and the light-axis of the emission light L10 is, the larger the shift amount of the light-axis is. In addition, the example in which the split-lights are overlapped without a gap in the fast-axis direction F is set forth, a gap can be set up between the split-lights along the fast-axis direction F.

As set forth above, according to the light-emitting device 1, the split-lights L11~L1n obtained by splitting the emission light L10 along the slow-axis direction S, in which the beam quality is poor, are overlapped and arrayed in the fast-axis direction F. In such a way, the poor quality in the slow-axis direction S is dispersed in the fast-axis direction F, so that the beam quality in the slow-axis direction S improves. As a result, the shaped-beam L20, in which the beam quality improves, is obtained.

In addition, according to the light-emitting device 1, the beam shaping module 30 made of the inexpensive optical elements such as a laser splitter, an optical mirror and a prism improves the beam quality in the slow-axis direction S. Specifically, the shaped-beam L20, in which the beam quality improves despite the low cost, is obtained.

Figure 7A:
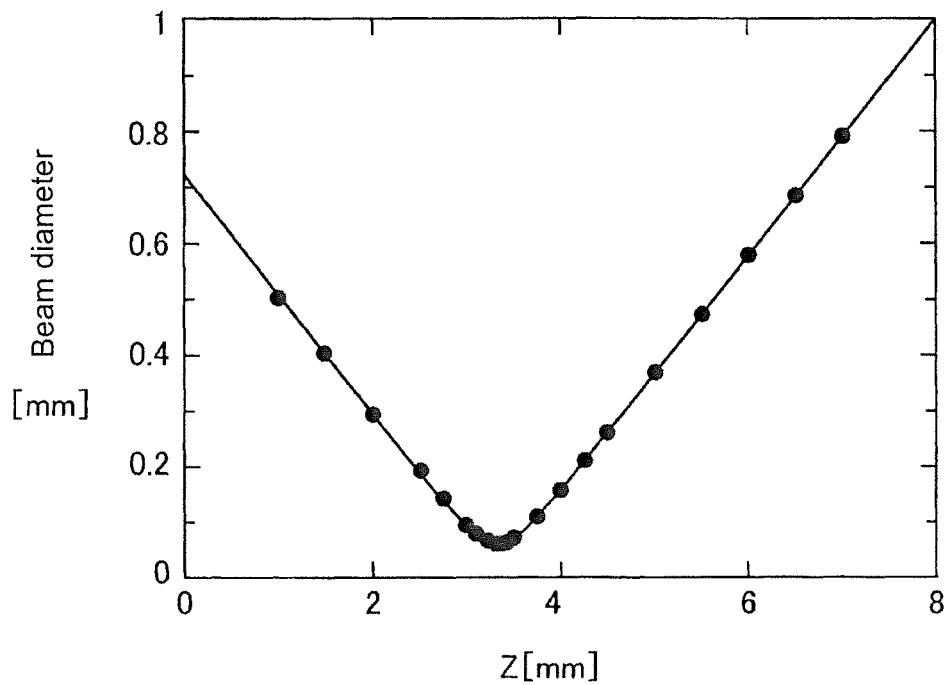
FIG. 7A is a graph illustrating a beam diameter of the beam that the light-emitting device, according to the aspect of the Embodiment 1 of the present invention, carries out beam-shaping.

FIG. 7A is illustrating the Embodiment relative to the beam diameter of the converging beam that the light converging device 3 converges the shaped-beam L20. The horizontal axis is the distance Z in the positive direction, in which the converging beam travels toward the converging spot from the reference point (0 mm) that is an arbitrary location after the converging beam passed the light converging device 3. In addition, FIG. 7A is illustrating the Embodiment relative to the beam diameter of the converging beam overlapped in the fast-axis direction F after the beam shaping module 30 split the emission light L10 to two in the slow-axis direction S by almost the same strength.

Figure 7B:
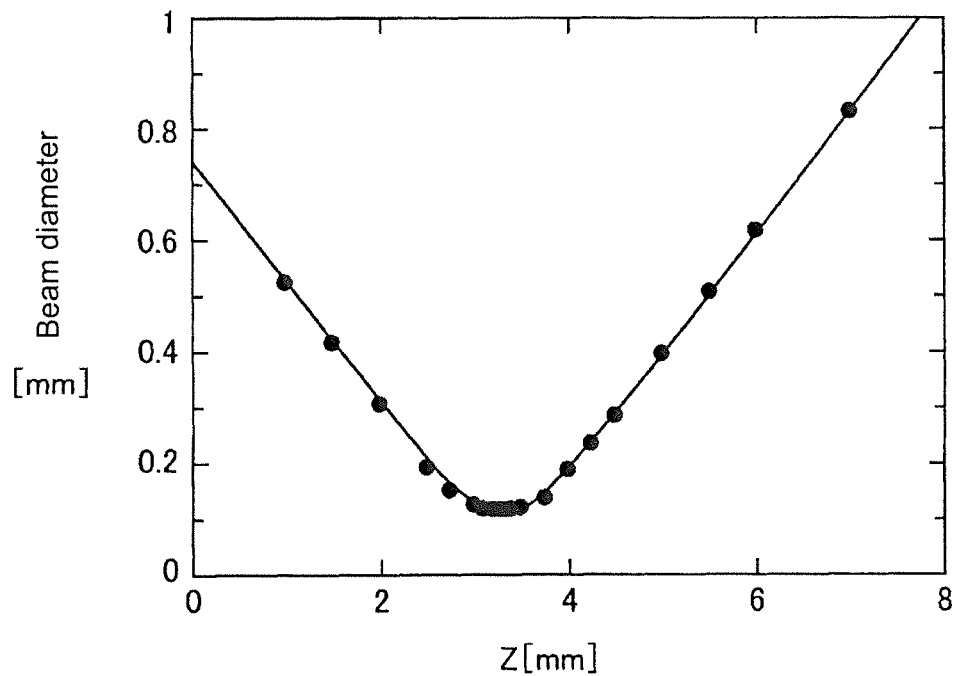
FIG. 7B is a graph illustrating the beam diameter of the beam according to the comparative Embodiment.

In addition, FIG. 7B is illustrating the beam diameter of the converging beam of the comparative Embodiment, in which the beam shaping module 30 does not conduct the beam shaping. FIG. 7B is illustrating the beam diameter of the converging beam when the light converging device 3 is in-place at the same location as the case in FIG. 7A in the state in which the beam shaping module 30 is not in-place.

Comparing FIG. 7A and FIG. 7B, the converging diameter where the beam diameter of the converging beam is thinnest after converging is approximately half of the comparison Embodiment by conducting a beam shaping with the beam shaping module 30. In addition, M-square value is approximately half of the M-square value of the comparison Embodiment. In such a way, the light-emitting device 1, according to the aspect of the Embodiment, improves the beam quality.

As set forth above, according to the aspect of the Embodiment of the present invention, the light-emitting device 1 splits the emission light L10 emitted from the light source 10 having the single emitter to a plurality of split-lights in the slow-axis direction S and layers and arrays such split-lights in the fast-axis direction F. As a result, with respect to the emission light L10, the beam quality thereof in the slow-axis direction S improves and the shaped-beam L20 converges into the smaller diameter with the high-quality thereof. Accordingly, for example, the emission light L10 couples with an optical fiber having a small diameter and a low NA in a high-efficiency.

Figure 8:
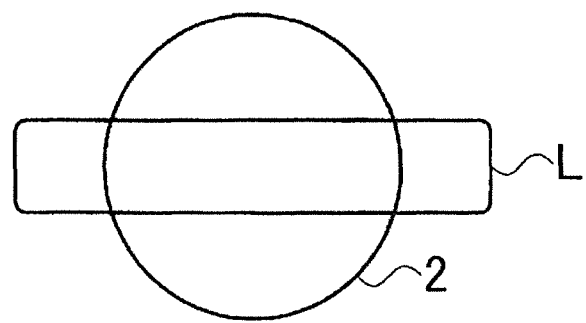
FIG. 8 is a schematic diagram illustrating a beam shape of traveling surface of a comparison Embodiment.

In addition, with regard to the light-emitting device 1, the beam diameter in the slow-axis direction S is shorter, for example, as illustrated in the comparison Embodiment referring to FIG. 8, a decrease of the coupling efficiency due to the side-drop of the edge of the beam L outside the light receiving device 2 is prevented.

In addition, the beam shape of the shaped-beam L20 also depends on the collimator 20. Therefore, according to the beam quality of the light source 10 and the specification of the light receiving device 2, the property and arrangement of the collimator lens should be examined.

Alternative Embodiment 1

According to the above Embodiment, the beam of the emission light L10 is equally split to two. Whereas, the beam shaping module 30 may split the emission light L10 to provide a plurality of split-light of which at least one split-light has the different length in the slow-axis direction S from other split-lights.

Figure 9:
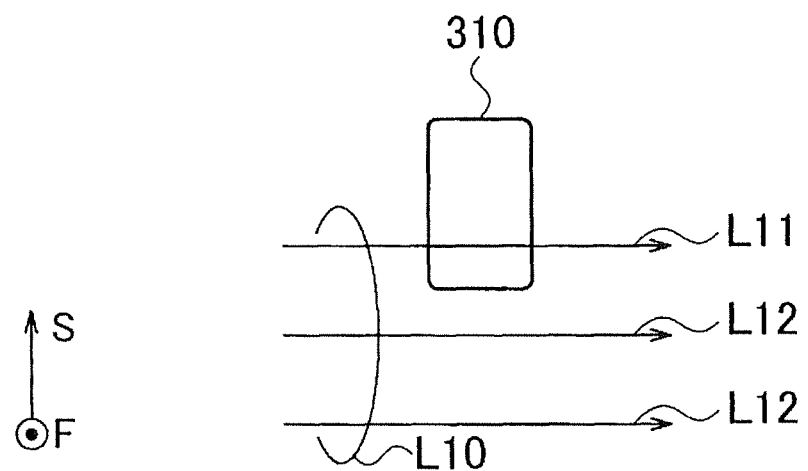
FIG. 9 is a schematic diagram illustrating dividing the emission light viewing from the fast-axis direction by the light-emitting device according to the aspect of the first alternative Embodiment of the Embodiment 1 of the present invention.
Figure 10:
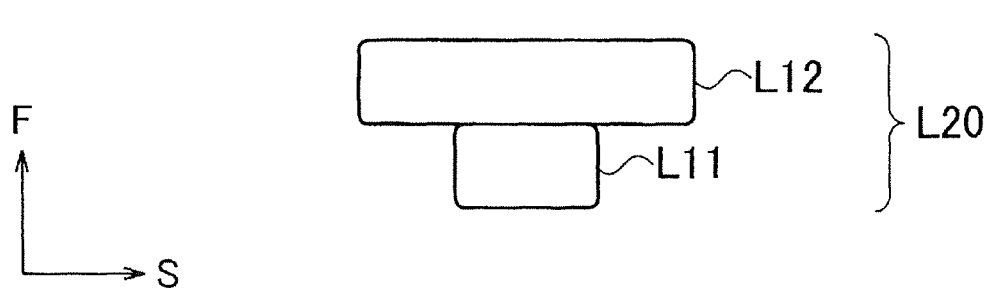
FIG. 10 is a schematic diagram illustrating the beam shape of the traveling surface of the shaping beam obtained by the light-emitting device according to the aspect of the first alternative Embodiment of the Embodiment 1 of the present invention.

Referring to FIG. 9, for example, the beam quality in the slow-axis direction S improves by just splitting the emission light L10 without particularly splitting equally to two lights. According to the Embodiment referring to FIG. 9, the ratio of the split-light L11 that passes through the laser splitter 310 uses as the light splitting element 31, is less than half. Accordingly, referring to FIG. 10, the beam shape of traveling surface of the combined shaped-beam L20 of the split-light L11 and the split-light L12 in the fast-axis direction F is not a rectangular shape.

When splitting the emission light L10 equally into two, the edge of the light splitting element 31 locates at the center of the beam of which the strength of the emission light L10 is highest. Therefore, when a part of the emission light L10 is dispersed or absorbed at the edge of the light splitting element 31, a decreasing rate of the strength of the emission light L10 might be big.

On the other hand, referring to FIG. 9, given the edge location of the light splitting element 31 shifts from the center of the beam, the decreasing rate of the strength of the emission light L10 is suppressed.

Alternative Embodiment 2

Figure 11:
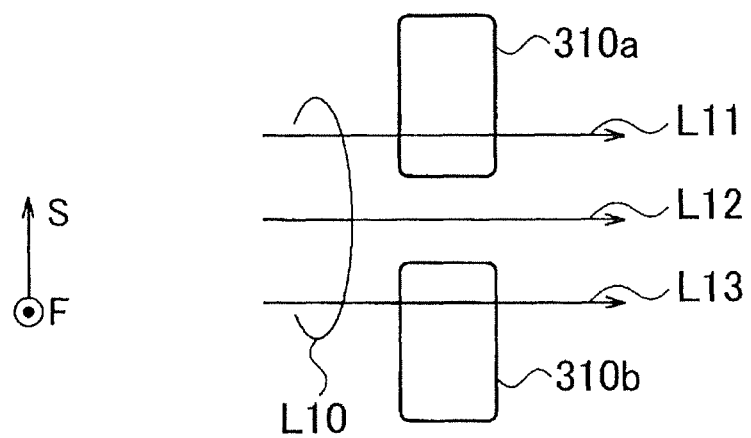
FIG. 11 is a schematic diagram illustrating dividing the emission light viewing from the fast-axis (vertical) direction by the light-emitting device according to the aspect of the second alternative Embodiment of the Embodiment 1 of the present invention.

As set forth above, the emission light L10 of the light source 10 is split to two, the emission light L10 can be split to more than 3 using a plurality of the light splitting elements 31. For example, referring to FIG. 11, the first laser splitter 310a and the second laser splitter 310b split the emission light L10 to 3, i.e., the split-light L11, the split-light L12 and the split-light L13.

Figure 12:
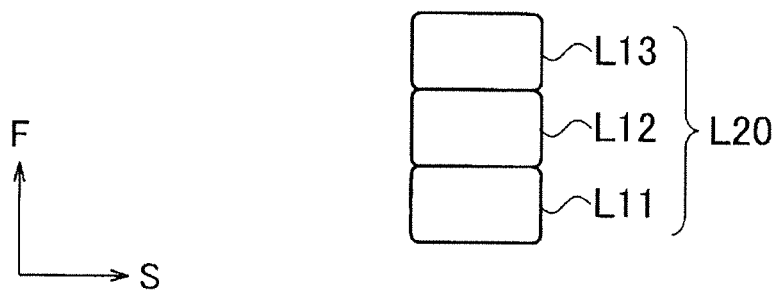
FIG. 12 is a schematic diagram illustrating the beam shape of the traveling surface of the light-emitting device according to the aspect of the second alternative Embodiment of the Embodiment 1 of the present invention.

Accordingly, referring to FIG. 12, the shaped-beam L20, of which the split-light L11—the split-light L13 are overlapped thrice in the fast-axis direction F, is obtained. As a result, the beam quality in the slow-axis direction S improves three times.

Alternative Embodiment 3

An optical element other than the laser splitter is applied to the light splitting element 31. For example, a right-angle prism splits the emission light L10.

Figure 13:
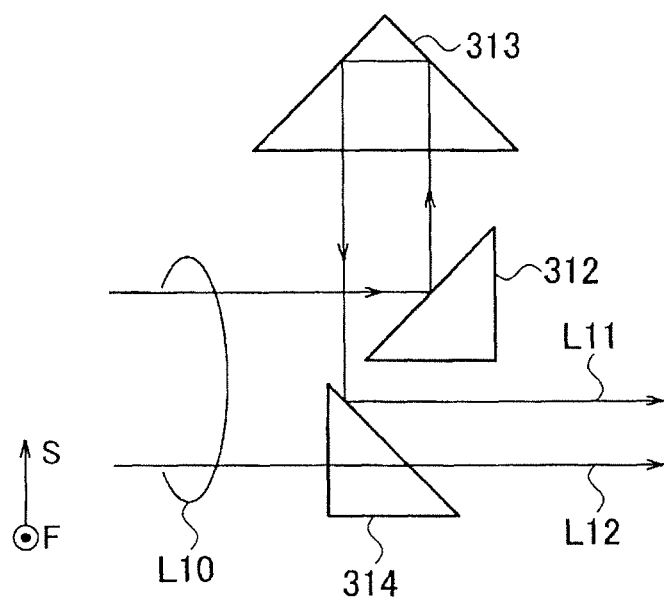
FIG. 13 is a schematic diagram illustrating the structure of the beam shaping module of the light-emitting device according to the aspect of the third alternative Embodiment of the Embodiment 1 of the present invention.

Specifically, referring to FIG. 13, a part of the emission light L10, as a split-light L11, is guided to the second prism 313 for retroreflection by the first prism 312. The split-light L11 is retroreflected (folding back) inside the second prism 313 and then guided to the third prism (mirror) 314. Now, the split-light L11 reflected at the third prism (mirror) 314 and the split-light L12, which is another part of the emission light L10, that transmits the third prism (mirror) 314 overlap in the fast-axis direction F.

Embodiment 2

Figure 14:
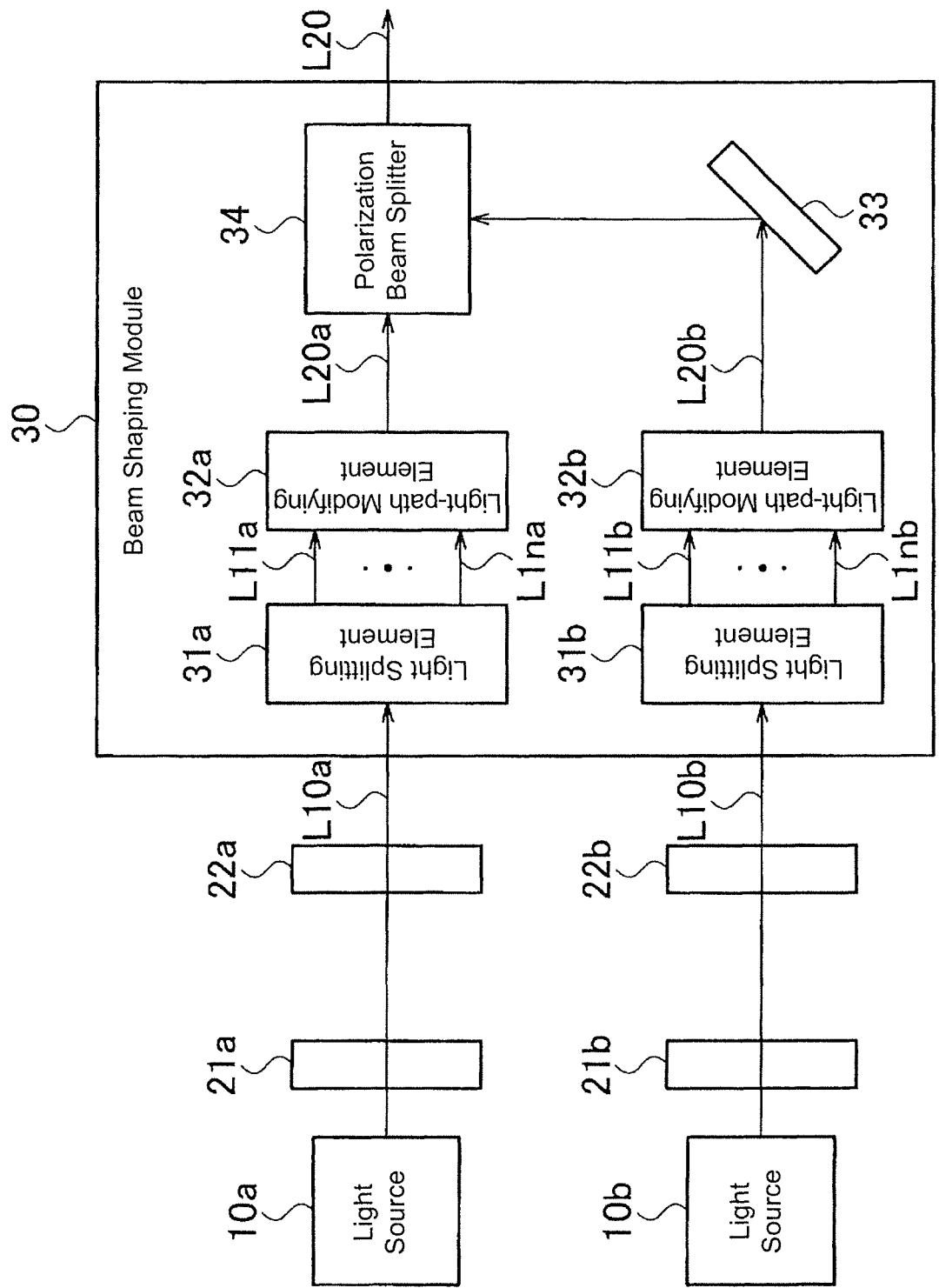
FIG. 14 is a schematic diagram illustrating the structure of a light-emitting device according to the aspect of the Embodiment 2 of the present invention.

Referring to FIG. 14, the light-emitting device 1 according to the aspect of the Embodiment 2 of the present invention comprises the first light source 10a and the second light source 10b, and each of which polarization direction differs from each other.

The first emission light L10a from the first light source 10a is collimated by the first F-axis collimator lens 21a followed in the fast-axis direction F followed by being collimated by the first S-axis collimator lens 22a in the slow-axis direction S. Then, the collimated first emission light L10a is guided to the beam shaping module 30. The second emission light L10b from the second light source 10b is collimated by the second F-axis collimator lens 21b in the fast-axis direction F followed by being collimated by the second S-axis collimator lens 22b in the slow-axis direction S. Then, the collimated second emission light L10b is guided to the beam shaping module 30.

The beam shaping module 30 according to the aspect of the Embodiment 2 carries out beam shaping of the first emission light L10a of the first light source 10a by the first light splitting element 31a and the first light-path modifying element 32a. Specifically, the first shaped-beam L20a is obtained by overlapping the split-lights L11a~L1na in the fast-axis direction F following splitting the first emission light L10a to a plurality of split-lights L11a~L1na in the slow-axis direction S.

As well as, the beam shaping module 30 according to the aspect of the Embodiment 2 carries out beam shaping of the second emission light L10b of the second light source 10b by the second light splitting element 31b and the second light-path modifying element 32b. Specifically, the first shaped-beam L20b is obtained by overlapping the split-lights L11b-L1nb in the fast-axis direction F following splitting the first emission light L10b to a plurality of split-lights L11b~L1nb in the slow-axis direction S.

Referring to FIG. 14, the beam shaping module 30 combines the first shape beam L20a and the second shaped-beam L20b of which the light-path is modified by the optical mirror 33 by the polarization beam splitter 34. In such a way, the first emission light L10a from the first light source 10a and the second emission light L10b from the second light source 10b are polarized and combined and then, the shaped-beam L20, of which beam quality in the slow-axis direction S is improved, is output from the beam shaping module 30.

In addition, a beam splitter may be inserted between the polarization beam splitter 34 and the first light-path modifying element 32a or the second light-path modifying element 32b. Each beam shape of the first shaped-beam L20a and the second shaped-beam L20b can be confirmed by monitoring the beam split by the beam splitter.

According to the aspect set forth above, the number of the light sources 10, of which polarization direction differs from each other, is two, but the number of the light sources 10 can be larger than 3. With respect to the light-emitting device 1 according to the aspect of the Embodiment 2, a plurality of shaped-beams of which the respective emission lights from a plurality of light source, of which each polarization direction differs from each other, is polarized and combined and then, the shaped-beam L20 of which the beam quality is improved in the slow-axis direction S is obtained. In addition, a plurality of shaped-beams is polarized and combined to increase the strength of the shaped-beam L20. Other aspects are the same as the Embodiment 1 and the duplicate description is skipped.

Other Embodiments

As set forth above, the present invention is described according to the aspect of the Embodiments, but it should not be understood that any parts, description and FIGS., of the present disclosure may limit the present invention. According to the present disclosure, a person skilled in the art can realize that a variety of the alternative Embodiment and applicable technology are clear.

Figure 15:
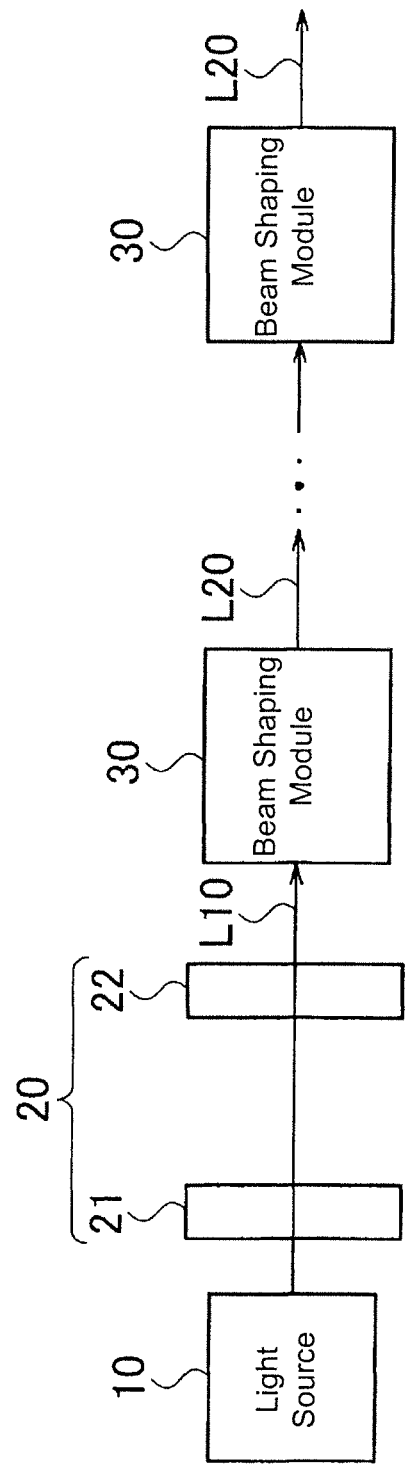
FIG. 15 is a schematic diagram illustrating the structure of a light-emitting device according to the aspect of another Embodiment of the present invention.

For example, according to the aspect of the Embodiment 1 set forth above, the number of the beam shaping module 30 is one. However, for example, referring to FIG. 15, a plurality of beam shaping modules 30 can be multiplied and connected. Referring to FIG. 15, with respect to the light-emitting device 1, the shape beam L20 output from each beam shaping module 30 is guided to the beam shaping module 30 in the next position. The number of connected beams shaping modules 30 is arbitrarily set up depending on the beam quality of the emission light L10 from the light source 10 and a required diameter for the shaped-beam L20 or the specification of the light receiving device 2.

In addition, as set forth above, the light emitting device 1 comprises the collimator 20 that collimates the emission light L10 from the light source 10. However, when the light source 10 that emits the collimated emission light L10 is used, the collimator 20 can be eliminated.

In addition, the light emitting device 1 according to the aspect of the Embodiment is applicable to a variety of light sources 10 of which the beam quality in the slow-axis direction S is relatively poor compared to the beam quality in the fast-axis direction F. Specifically, for example, a solid laser other than the semiconductor laser light source can be applied to the light source 10.

In addition, according to the aspect of the Embodiment as set forth above, whereas the emission light L10 is coupled to the light receiving device 2 after converging lights by the converging device 3, the light emitting device 1 can be applied to the other use. For example, the aspect of present invention is also applicable to the use in which the shaped-beam L20 from the beam shaping module 30 is directly irradiated to a target.

Needless to say, the present invention may include a variety of Embodiments that are not described here.

REFERENCE OF SIGNS

1 Light Emission element
2 Light receiving device
3 Light Converging element
10 Light source
20 Collimator
21 F-axis collimator lens
22 S-axis collimator lens
30 Beam shaping module
31 Light splitting element
32 Light-path modifying element
34 Polarization beam splitter
310 Laser window (window, splitter)
313 Second (right-angle) prism
320 Pair of optical mirror
F Fast-axis direction
S Slow-axis direction
L10 Emission light
L11~L1n Split light
L20 Shaped-beam Those of skill would further appreciate that the various illustrative logical blocks, elements, modules, circuits, and algorithm steps described in the flow chart steps discussed herein in connection with the embodiments disclosed herein may be implemented in any suitable manner, including as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

Also, the inventors intend that only those claims which use both 'means' and 'for' in combination as the words "means for" are intended to be interpreted under 35 USC 112, sixth paragraph/(f). Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A light-emitting device, comprising:
a first light source;
a second light source, each of the first and second light sources having:
   a single emitter; and
   a first beam shaping module, wherein:
      said first beam shaping module splits an emission light received from a respective one of said first and second light sources into a plurality of split-lights in a slow-axis direction;
      said beam shaping module also shapes a shaped-beam in which said plurality of split-lights are arrayed in a fast-axis direction;
   said first beam shaping module comprising:
      a light splitting element that modifies an original light-axis of a part of said emission light and splits said emission light to said plurality of split-lights in said slow-axis direction;
      a light-path modifying element that propagates respectively said plurality of split-lights in different light-paths, said light path modifying element comprising said respective light-paths of said plurality of split-lights, the emission light of the first light source and the second light source being emitted in parallel directions to one another; and
   an optical mirror redirects said shaped-beam of said second light source from said slow-axis direction in an orthogonal direction;
   a polarization beam splitter receives said shaped-beam of said first light source in said slow-axis direction and said shaped-beam of said second light source that was redirected by said optical mirror, wherein said polarization beam splitter polarizes and combines said redirected shaped-beam of said second light source and said shaped-beam of said first light source;
   a collimator that collimates said emission light from respective the first and second light sources in said fast-axis direction and said slow-axis direction, said collimator further comprising:
      an F-axis collimator lens that collimates said emission light from respective first and second light sources in said fast-axis direction and an S-axis collimator lens that collimates said emission light from said respective first and second light sources, which said F-axis collimator lens collimates, in said slow-axis direction; and
      said emission light from said respective first and second light sources is collimated in said fast-axis direction and said slow-axis direction are guided to said first beam shaping module; and
   a second beam shaping module that receives emitted light from said first beam shaping module.

2. The light-emitting device, according to claim 1, wherein:
said first beam shaping module splits said emission light from said respective first and second light sources to at least three said split-lights and arrays each said split-lights in said fast-axis direction.

3. The light-emitting device, according to claim 1, wherein:
said first beam shaping module splits said emission light from said respective first and second light sources so that respective lengths of said plurality of split-lights in said slow-axis direction are identical.

4. The light-emitting device, according to claim 1, wherein:
said first beam shaping module splits the said emission light from said respective first and second light sources so that at least one said split-light of said plurality of split-lights in said slow-axis direction has a different length from other said split-lights in said slow-axis direction.

* * * * *